United States Patent [19]
Evans

[11] 4,240,674
[45] Dec. 23, 1980

[54] POSITIVE LUBRICATING AND INDEXING BEARING ASSEMBLY

[76] Inventor: Robert F. Evans, 631 Honeywood La., La Habra, Calif. 90631

[21] Appl. No.: 95,532

[22] Filed: Nov. 19, 1979

[51] Int. Cl.³ .............................................. F16C 19/34
[52] U.S. Cl. ...................... 308/8.2; 308/35; 308/187; 308/231; 308/234
[58] Field of Search ............... 308/8.2, 35, 174, 176, 308/207 R, 187, 231, 234; 175/371

[56] References Cited

U.S. PATENT DOCUMENTS

| | | | |
|---|---|---|---|
| 1,946,652 | 2/1934 | Wallgren | 308/35 |
| 2,373,860 | 4/1945 | Torresen | 308/35 |
| 2,664,321 | 12/1953 | Noble | 308/8.2 |
| 3,235,316 | 2/1966 | Whanger | 308/8.2 |
| 3,244,459 | 4/1966 | Ortloff | 308/8.2 |
| 3,251,634 | 5/1966 | Dareing | 308/8.2 |
| 3,301,611 | 1/1967 | Dunlap | 308/5 |
| 3,410,618 | 11/1968 | Harris et al. | 308/212 |
| 3,476,446 | 11/1969 | Neilson | 308/8.2 |
| 3,549,214 | 12/1970 | Neilson | 308/8.2 |
| 3,601,456 | 8/1971 | Becker | 308/8.2 |
| 3,663,073 | 5/1972 | Bronson | 308/8.2 |
| 3,719,241 | 3/1973 | Bell | 175/228 |
| 3,746,405 | 7/1973 | Welton | 308/8.2 |
| 3,765,071 | 10/1973 | Bowen | 29/148.4 A |
| 3,845,994 | 11/1974 | Trey | 308/8.2 |
| 3,866,987 | 2/1975 | Garner | 308/8.2 |
| 3,890,018 | 6/1975 | Clamon | 308/8.2 |
| 3,930,693 | 1/1976 | Bowen | 308/207 R |
| 4,002,380 | 1/1977 | Bowen | 308/207 R |
| 4,033,646 | 7/1977 | Lang et al. | 308/218 |
| 4,074,922 | 2/1978 | Murdoch | 308/8.2 |
| 4,080,018 | 3/1978 | Traut | 308/202 |
| 4,133,587 | 1/1979 | Kume | 308/183 |

*Primary Examiner*—Lenard A. Footland
*Attorney, Agent, or Firm*—John R. Ley

[57] ABSTRACT

Positive lubricating elements and positive indexing elements are retained between raceways of two relatively rotating race members of a bearing assembly. Sliding load bearing segments may also be retained between the raceways, and the indexing elements derive force from relative rotation of the raceways to index or move the bearing segments relative to both raceways. Lubricant is forced into the raceways by the lubricating elements. Preferably the lubricating and indexing elements are both defined by hollow roller spring elements which are resiliently compressed between the raceways and which separate adjacent bearing segments. Lubricant is carried within the hollow interior of the roller elements. Means associated with the roller elements and race members operatively reduces the volume of the interior of the roller element and forces lubricant on the raceways, preferably at positions where the race members withstand large loads. At other positions the interior volume of the roller element is expanded to accept more lubricant.

31 Claims, 7 Drawing Figures

POSITIVE LUBRICATING AND INDEXING BEARING ASSEMBLY

BACKGROUND OF THE INVENTION

1. Field of the Invention

This invention relates to new and improved bearing assemblies. More particularly, the invention relates to a new and improved bearing assembly comprising means for positively lubricating various moving elements of the assembly and for positively indexing load-bearing segments of the assembly. The bearing assembly of the present invention is particularly useful for supporting large loads such as those encountered by bearings which attach the cutting wheels to a rotary drill bit. Many other uses are also comtemplated.

2. Brief Description of Prior Art

A variety of different bearing assemblies are known in the art, including some specifically adapted for supporting large loads.

U.S. Pat. Nos. 3,549,214 and 3,476,446 are examples of floating segmented bearing assemblies comprising bearing segments retained in a torus between raceways of a rotating cutter wheel and a journal pin of a rotary drill bit. The bearing segments provide enlarged load-bearing surface area to withstand high loads.

High speed bearings usually employ rotational elements such as balls or rollers which rotate between the two relatively rotating race members and support the race members with respect to one another. The antifriction rotational elements divide the relative motion of the raceway members between two or more pairs of contact surfaces and reduce the speed of relative movement at each contact surface, thereby allowing bearing operation at high speeds. Rotational load-bearing elements have limited load carrying capacity. The contact of the rotational balls or rollers with the race members at essentially a point or line concentrates the bearing load on a very small surface area, and damage to the bearing structure will eventually result if the load is not limited.

In order to assure that the rotational elements move at a differential speed during relative rotation of the race members, it is known to slightly compress or preload the rotational elements between the two race members. U.S. Pat. Nos.4,410,618; 3,765,071; 3,930,693 and 4,002,380 disclose hollow compressible rotational elements in bearing assemblies, and U.S. Pat. No. 4,133,587 discloses elastic non-hollow rotational elements. Elastic rotational elements are also utilized in a Hyatt bearing described in *Mechanical Designs of Machines* by Siegel, Maleeve and Hartman, International Textbook Co., Scranton, Pennsylvania, 4th edition, p. 455. Of course, hollow or very soft rotational elements are structurally incapable of withstanding very large loads before destruction. On the other hand, solid inflexible rotational elements cannot resiliently deform a sufficient amount to maintain compression force between the race members when passing through areas of large variations in clearance in the bearing.

Bearing assemblies combining both compressible roller elements and sliding bearing elements are disclosed in U.S. Pat. Nos. 3,301,611; 4,133,587; 2,373,860 and 1,946,652. Although some of these combination bearing constructions achieve a limited measure of cooperation between the roller elements and the bearing segments, an increased degree of operative interaction between the elements and enhanced bearing performance under the application of high loads are desirable. In the field of rotary drill bits and rotary drilling there is a substantial and continuing need for improved bearings that increase the useful lifetime of drill bits.

In any bearing assembly adequate lubrication is important to obtain good performance and longevity of use. The lubricant should be continuously applied over all the moving and load bearing surfaces. A variety of different lubricating arrangements for bearings are disclosed in U.S. Pat. Nos. 3,244,459; 3,301,611; 3,890,018; 3,663,073; 3,251,634; 3,746,405; 3,845,994; 3,866,987; 3,719,241; 4,033,646 and 4,074,922, and by the Hyatt bearing. Many of these lubricating devices employ additional apparatus in conjunction with the bearing assembly, or are not suitable for convenient incorporation into a bearing assembly, or are not as effective as is now possible.

It is apparent that various features, arrangements and apparatus are known in the field of bearing assemblies. Comprehension of these prior art arrangements should lead to an enhanced appreciation of the significance of the present invention and its improvements and advancements in the art.

SUMMARY OF THE INVENTION

The new and improved bearing assembly of the present invention is of the type which provides substantial and advantageous lubricating capabilities. The bearing construction of the present invention also obtains enhanced cooperation between its moving elements to obtain better high-speed operating characteristics while maintaining a high load-carrying capability. The present invention also advances the art of combination roller-and-sliding-element bearings by integrating a positive lubricating feature into the bearing assembly without significantly altering the number and arrangement of elements of the bearing. Lastly, the present invention furthers the development of the art of rotary drill bits by providing a bearing assembly of advanced operational capability for attaching a cutting wheel to the drill bit.

By way of generalized summary, the present invention comprises means defining a pair of relatively movable race members having separated raceways between which various movable elements are positioned. The movable bearing elements include sliding load-bearing segments, positive indexing means and positive lubricating means. The load-bearing segments adjoin the raceways at surface areas substantially greater than areas of a point or line contact and are capable of withstanding very high loads. The positive indexing means are operatively associated with the race members and derive sufficient force from relative rotation of the race members to index or move the bearing segments between the raceways at a relative rate different than either of the rotational rates of the race members under application of high load to the bearing assembly. The positive lubricating means is preferably associated with the indexing means. The positive lubricating means applies or forces lubricant into the space between the raceways as the bearing segments are positively indexed relative to the two relatively rotating race members. The amount of lubricant applied to certain high load-bearing areas of the bearing assembly is increased. Means associated with the race members cause the positive lubricating means to force an increased amount of lubricant on to the raceways at positions of increased load while allowing the lubricant of the lubricating means to be replenished at positions where decreased loads are experienced.

In one preferred embodiment the positive indexing and lubricating means comprise elastic roller elements having hollow interior chambers. Each roller element separates a pair of adjacent bearing segments. Elastic compression of the roller elements between the raceways causes them to roll between the raceways with sufficient driving force to index or move the bearing segments at an angular velocity near one-half that of the rotating race member. The interior chamber of the roller element contains the lubricant and passageways through the roller element conduct the lubricant to the raceways. An end element is operatively connected with the roller element to increase and decrease the volume of the interior lubricant chamber when the end element is moved toward and away from the center of the roller element. Cam means is associated with at least one race member and contacts the end element and moves the end element toward and away from the center of the roller element as the roller element and race member move relative to one another. The interior volume of the chamber is reduced and lubricant is expelled from the chamber onto the raceways, preferably when the race member and roller element attain a predetermined relative position at which the bearing segments are required to withstand increased loads. At a different predetermined relative position where decreased load is experienced, the cam means allows the end element to expand the interior chamber and admit a replenished supply of lubricant. In this manner the positive lubricating means pumps increased lubricant to high load-bearing areas of the assembly and replenishes its supply of lubricant from low load-bearing areas of the assembly.

The bearing segments are capable of withstanding relatively large loads, and certainly loads of greater magnitude than rotational load bearing segments such as rollers or balls, which concentrate the load over a relative small point or line contact on the raceways. The positive indexing means assures continuous differential movement of the bearing segments with respect to the raceways thus reducing frictional heat and allowing more reliable and extended high speed operation. The lubricating means continually distributes lubricant through the bearing assembly and increases a supply of lubricant at the high load positions where it is needed most.

A more complete description of the scope and details of the present invention and its preferred embodiment is presented in the description of the preferred embodiment, in the drawings and their description, and in the appended claims, all of which follow.

DESCRIPTION OF THE PREFERRED EMBODIMENTS

Figure 1:
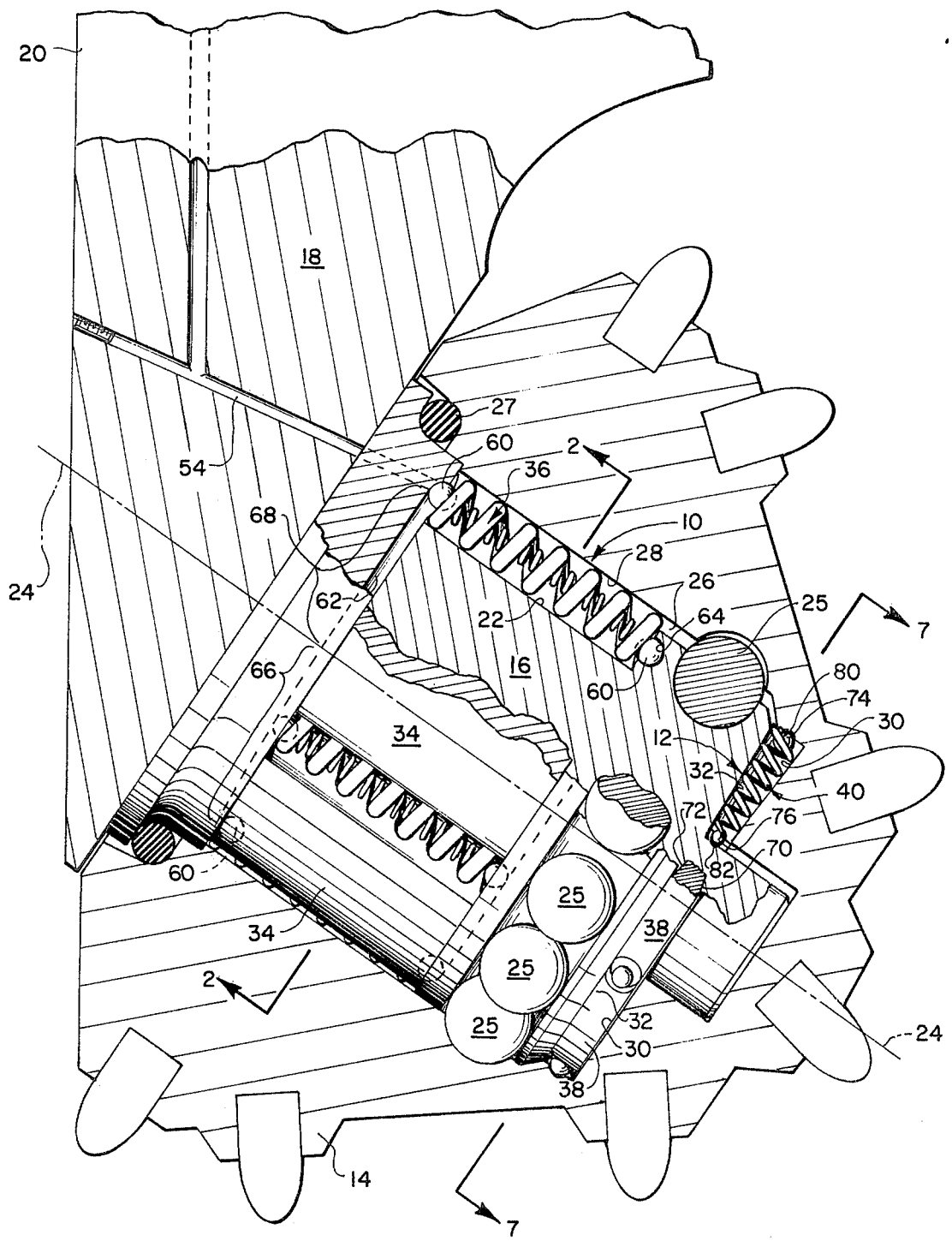
FIG. 1 is a side view, partially in section and partially in elevation, with certain elements broken away for clarity, of a portion of a rotary drill bit in which thrust and radial bearing assemblies embodying the present invention are incorporated.

A radial bearing assembly 10 and a thrust bearing assembly 12, both embodiments of the present invention, are illustrated in FIG. 1 as supporting a cone-like cutter wheel 14 for rotation on a bearing or journal pin 16 of a bit body 18 of a rotary drill bit, one leg 20 of which is shown. Although various types of bearing assemblies have been used in drill bits, the bearing assemblies 10 and 12 of the present invention achieve significant advantages and improvements over the prior art in the field of drill bits and in other fields and adaptations. The radial bearing assembly 10 and the thrust bearing assembly 12 can be used independently of one another, but both assemblies are disclosed in FIG. 1 for illustrative purposes.

The bearing assemblies 10 and 12 each comprise structural means defining a pair of race members retained for relative rotation with respect to one another. One race member is defined by the journal pin 16 which is fixed in a non-rotational sense to the drill body 18. The other race member is defined by the cutter wheel 14 which rotates with respect to the fixed journal pin 16. Relative rotation of the race members results when the drill bit is rotated with the cutter wheels contacting the earth material during drilling. The race members 14 and 16 thus occupy a relative rotational relationship. In other embodiments the relative rotational relationship is maintained when both race members are rotationally retained and each race member rotates at a different rate or in a different direction with respect to the other race member.

Figure 2:
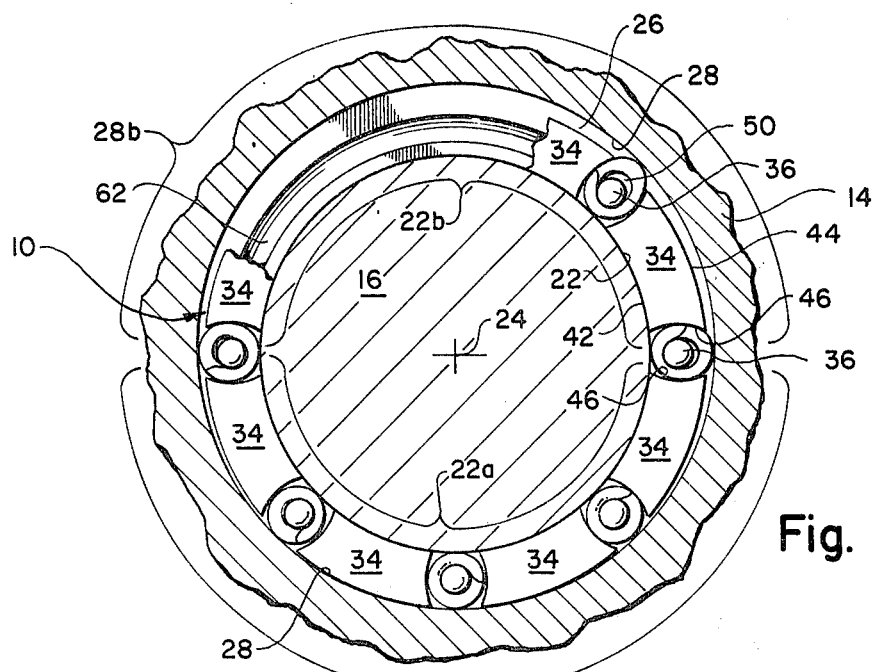
FIG. 2 is a section view taken substantially in the plane of line 2—2 of FIG. 1, with certain portions broken away for clarity, which illustrates elements of the radial bearing assembly.

Each race member defines a raceway for each bearing assembly. An interior surface 22 of the journal pin 16 defines one raceway for the radial bearing assembly 10, as shown in FIGS. 1 and 2. The surface 22 is concentric about an axis 24 through the journal pin, and the axis 24 substantially corresponds to the rotational axis of the bearing assemblies 10 and 12. The cutter wheel 14 is formed with a hollow interior opening, generally referenced at 26, for receiving therein elements of bearing assemblies 10 and 12, the journal pin 16 and other conventional drill bit elements such as ball bearings 25 and a seal 27. An internal portion or surface 28 of the interior opening 26 defines the other raceway for the radial bearing assembly 10. Except for clearances and wear offsets, surface 28 is substantially concentric with the raceway 22, and the rotational axis of the cutter wheel 14 substantially corresponds with the axis 24. The raceways or surfaces 22 and 28 are thus annularly retained or positioned in radially spaced apart and opposing confronting relation in the radial bearing assembly 10.

Raceways for the thrust bearing assembly 12 are defined by surfaces 30 and 32 formed respectively on the cutter wheel 14 and journal pin 16. The surfaces 30 and 32 extend transversely with respect to the rotational axis 24 of the thrust bearing assembly 12 near the terminal end of the journal pin 16, and the surfaces 30 and 32 are positioned in axially spaced apart and opposing confronting relation. The surfaces 22, 28, 30 and 32 are hardened, material treated or otherwise conditioned in a manner known in the art to allow movement and an extended lifetime of use of the elements of the bearing assemblies 10 and 12 over the raceways.

Figure 7:
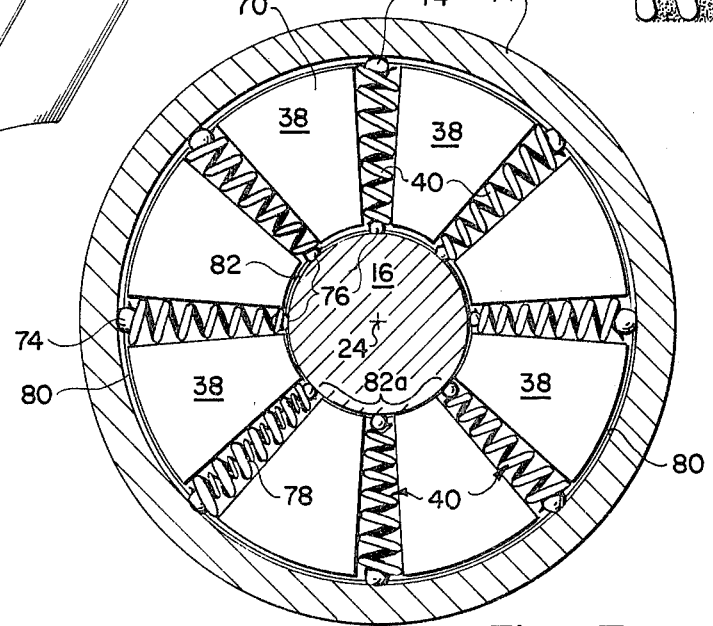
FIG. 7 is a elevational view of the thrust bearing assembly taken substantially in the plane of line 7—7 of FIG. 1.

The radial bearing assembly 10 further comprises a plurality of load bearing segments 34 and a plurality of driver roller elements 36, as shown in FIGS. 1 and 2. Similarly, the thrust bearing assembly 12 further comprises a plurality of load bearing segments 38 and a plurality of driver roller elements 40, as shown in FIGS. 1 and 7. The segments 34 and 38 and the driver roller elements 36 and 40 are movably retained within the space intermediate the opposing raceways of each bearing assembly. Preferably one driver roller is positioned to separate each two adjoining bearing segments, as is shown in FIGS. 2 and 7. The segments 34 and 38 withstand substantially all of the load applied between the raceways, and the amount of load withstanding capability of the bearing segments is relatively high. The driver roller elements 36 and 40 are one form of indexing means for moving the bearing segments relative to the relatively rotating raceways. By moving the segments 34 and 38 relative to the raceways, high speed operation may be achieved, temperature rise is limited and the concentration of load and wear on certain limited portions of the bearing assemblies is avoided, among other advantages.

Figure 4:
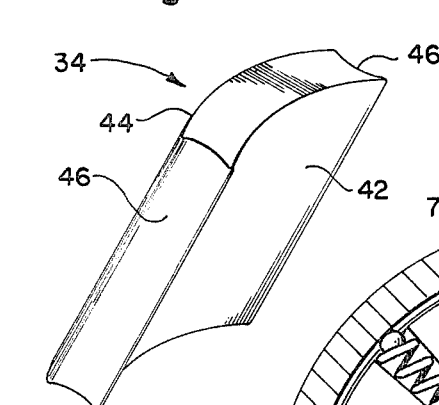
FIG. 4 is a perspective view of a load bearing segment shown in FIG. 1.

The load bearing segments 34 of the radial bearing assembly 10 are shown in FIGS. 2 and 4 to include a radially inner surface 42 and a radially outer surface 44 which are curved in corresponding complimentary relation respectively to the curvatures of the raceway surface 22 of the journal pin 16 and the raceway surface 28 of the cutter wheel 14. The surfaces 42 and 44 adjoin and are separated from the raceway surfaces 22 and 28, respectively, by a thin layer or film of lubricant, not specifically shown. Curved end surfaces 46 are formed on each circumferentially-oriented end of the segments 34. The end surfaces 46 present a substantial surface area of curvature generally similar to the curvature of the driver rollers 36. The bearing segments 34 are formed from metallic material having strength sufficiently high to support and withstand the predetermined maximum load on the bearing assembly without adverse effect. The curved surfaces 42 and 44 are treated or conditioned in a manner similar to the raceway surfaces 22 and 28.

The curved surfaces 42 and 44 of the segments 34 provide substantial load bearing surface areas adjacent the raceways. The load applied to the bearing assembly is distributed over the relatively large area of surfaces 42 and 44 to the raceways. In contrast, bearing assemblies having rotating load bearing elements such as roller bearings and ball bearings, concentrate the load at points or lines of contact on the race members. Since the raceway material can withstand only a finite load per unit of surface area before failing, the point and line contact substantially limits the maximum load carrying capability of the roller and ball bearing assemblies. By spreading the load over considerably larger surface areas of the surfaces 42 and 44, the present invention avoids concentrating the load at localized points or lines and achieves a much high load carrying capability. Very high load carrying capability is particularly important in rotary drill bits because the bearing assemblies attaching the cutter wheels to the drill bit body are required to withstand many thousands of pounds of load needed to achieve satisfactory drilling rates.

The relatively large surface areas of the surfaces 42 and 44 do not increase frictional forces tending to restrain relative movement of the bearing segments 34. Frictional force is related only to the force applied normally to the surface and the coefficient of friction between the moving surfaces. Increasing the surface contact area provided by the bearing segments significantly increases the load carrying capability but does not induce additional frictional restraining forces.

Each driver roller element 36 is formed of resilient material and extends radially in a slightly compressed or preloaded condition between the raceways 22 and 28. Each driver roller 36 also extends circumferentially between the end surfaces 46 of the two adjacent bearing segments 34. Each driver roller 36 rolls over the raceway surfaces 22 and 28 as the cutter wheel and journal pin rotate relative to one another, at a rate of movement different from the rates of movement of each relatively rotating raceway for reasons known in the art. Each driver roller is preferably freely rotationally retained between the raceways, meaning that each driver is not fixed in circumferential position relative to its adjacent bearing segments. During movement of the driver rollers relative to the raceways, the driver rollers contact at least one of the end surfaces 46 of the segments 34 and move the segments relative to each raceway. The corresponding complimentary relation of the end surfaces 46 provides a surface for the driver rollers to contact during movement.

The driver rollers 36 derive sufficient force from the relatively rotating race members to index or move the bearing segments 34 relative to both raceways. The driver rollers 36 are firmly elastically and resiliently compressed or preloaded in a radial sense between the raceways. The amount of radial compression force exerted on the raceways is directly related to the amount of frictional contact force each driver roller maintains with the raceways. Higher frictional contact force of the driver rollers with the raceways produces a greater force for indexing the segments. So long as the driver rollers roll and do not slide over the raceways, the driver rollers will move relative to the raceways and will push the bearing segments at the same rate at which the driver rollers move over the raceways. Slippage occurs when the frictional contact force is overcome; consequently, increasing the radial compression force increases the frictional contact force which, in turn, increases the amount of force derived for pushing the roller members. The amount of compression or preload force applied to the driver rollers is predetermined in accordance with the anticipated maximum load applied to the bearing assembly 10 under which movement of the segments 34 is required. The type of material from which the driver rollers are constructed is selected in accordance with the requirements for resiliency and the amount of radial compression which must be applied.

Figure 3:
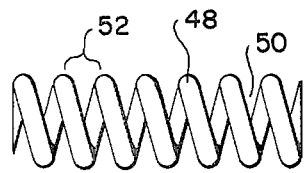
FIG. 3 is a side elevational view illustrating one embodiment of a driver roller element of a bearing assembly of the invention.

One advantageous construction for the driver roller elements 36 is that of a hollow, resiliently-deformable, cylinder-like member, preferably defined by a helically wound coil spring 48 such as that shown in FIG. 3. The helically wound spring 48 defines a hollow center interior 50 which is open at both of its longitudinal or axial ends. Spaces 52 between the separate coils of the spring 48 communicate from the hollow interior 50 to the exterior surface of the spring 48 which contacts and rolls against the raceways.

The helical coil spring construction has the advantage that it will deform or compress to a large extent in a radial sense without breaking or permanently deforming, and will apply considerable force in a radial sense to the raceways. Another advantage of the coil spring 48 is that it provides enhanced frictional contact force with the raceways. Each coil of the spring is generally circular in cross section, causing each coil to contact the raceway at a point or line, similar to the manner in which a ball bearing could contact a raceway. The concentrated preload force applied at the point contact of each coil with the raceway squeezes the lubricant away from this contact point. A reduction in lubricant at the contact point increases the effective coefficient of friction, and an increased driving force is obtained from coil spring, as compared to a tubular roller element. A tubular roller element presents a larger contact surface at the raceway and less curvature, and both of these characteristics would tend to squeeze less lubricant away from the contact points. However, despite the advantages of a coil spring driver roller, resilient tubular driver rollers are within the scope of the invention and may be satisfactorily employed in many applications. It is noted that squeezing the lubricant away from the coils of the spring does not create detrimental effects because the main load on the bearing assembly is supported by the bearing segments, not the drive rollers.

The driver rollers 36 are continually maintained in preloaded or resilient compressed condition between the raceways as they travel in the annular path between the raceways, even when the clearance between the raceways changes. Thus, all of the driver rollers apply indexing force to the segments. The collective driving force of the driver rollers is coupled through the torus defined by the end-to-end contact of the segments 34 and the driver rollers 36 and is applied to those bearing segments withstanding the high loads. For example, in applications such as drill bits where one of the race members is fixed in a non-rotational sense, the bearing load is typically applied only in one continual direction. In drill bits, the bearing load 53 (FIG. 2) is applied upward on the cutter wheel 14 which results in load concentration only on the lower semi-circular half or portion 22a of the journal pin 16 and the raceway 22. The portion 28a of the cutter wheel raceway 28 moving through the lower semi-circular portion 22a of the journal pin raceway 22 and the bearing segments 34 moving between portions 22a and 28a are required to withstand all the load applied to the bearing assembly. The upper semi-circular portion 22b of the journal pin raceway 22 and the upper portion 28b of the cutter wheel raceway 28 and the bearing segments between portions 22b and 28b do not withstand significant amounts of bearing load. As wear is experienced by the lower portion 22a of the journal pin raceway 22 and by the whole of the raceway 28 of the cutter wheel and by the load bearing surfaces 42 and 44 of the bearing segments 34, the clearance or radial separation increases between the portions 22b and 28b of the raceways 22 and 28. As the driver rollers 36 move through the areas of increased or changed clearance between the raceways, the driver rollers expand slightly in a radial sense. The predetermined amount by which the driver rollers are preloaded or compressed when the bearing is assembled is sufficient to allow for acceptable amounts of wear and to accommodate the increased clearances, while still maintaining sufficient frictional contact with the raceways to obtain driving or indexing force. Consequently, driving force from all of the driver rollers is available to index those bearing segments between the lower portions 22a and 28a of the raceways which are withstanding substantially the full load applied to the bearing assembly. Slight clearances and flexibility in a circumferential sense between a few of the driver rollers 36 and some of the segment ends 46 allow the driver elements to adjust themselves to maintain a contacting and pushing relation with the ends 46 of the segments as the clearance between the raceways changes and as the driver elements are resiliently deformed by the compression forces.

In addition to indexing or moving the bearing segments, the driver rollers also serve as lubricating means to apply lubricant to the raceways. The hollow interior 50 of each driver roller defines a chamber for receiving lubricant therein. Lubricant from the interior chamber is applied or printed on the raceways from the spaces 52 between the individual coils of the coil spring 48. Since the spaces 52 are present along the full axial length of each spring 48 (FIG. 3), and each spring 48 is of length approximately equal to the width of the path over which bearing segments move (FIG. 1), the lubricant is applied to the raceways over the full width of the movement path of the bearing segments.

Lubricant is supplied to replenish that used by the bearing assembly. Shown in FIG. 1, a channel 54 leads from a reservoir (not shown, but conventional in the drill bit art) formed in the bit body 18. The channel 54 leads to a point in the upper portion in the annular space between the raceways. As described in conjunction with FIG. 2 the clearance between raceways increases at the upper portion of the space between the raceways and each driver roller expands slightly when moving through this area because of the increased clearance between raceways. When the driver rollers expand, the hollow interior 50 increases in volume and allows additional lubricant to be received or loaded into the hollow interior from the supply channel 54. Preferably the source of lubricant for replenishing the hollow interior, i.e. channel 54, is located at a position where the driver rollers have expanded to a maximum. The position where maximum expansion occurs is that position at the top of the annular space between the raceways where channel 54 is located.

Figure 5:
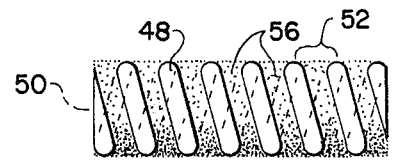
FIG. 5 is a side elevational view illustrating another embodiment of a driver roller element of a bearing assembly of the present invention.

The driver roller or coil spring 48 shown in FIG. 5 discloses another arrangement for applying lubricant to the raceways. The hollow interior 50 and the spaces between the individual coils of the coil spring 48 are filled with an elastomer material 56. The elastomer material is porous in its exterior and the pores fill with lubricant. When the porous exterior surface contacts the raceways, the pores deposit a thin, relatively-uniform film of lubricant on the surfaces. The porous elastomer material 56 distributes the lubricant in somewhat of a more uniform film over the bearing surfaces as compared to the lubricant deposited from the open spaces 52 between the individual coils of an open coil spring 48.

Figure 6:
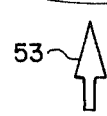
FIG. 6 is a side elevational view illustrating a combination driver roller and lubricating element shown in FIG. 1.
Figure 6:
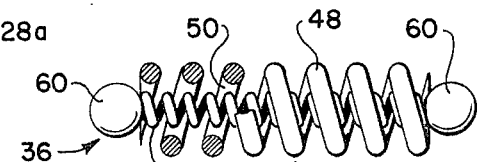

To forceably apply lubricant to the raceways, means for compressing the hollow interior 50 or reducing the volume of the lubricant chamber of each driver roller is provided. The driver rollers 36 shown in FIGS. 1 and 6 include an internal resilient spring 58 and end elements in the form of balls 60. The balls 60 are seated on the open circular ends of the spring 58. The internal spring 58 biases the balls longitudinally or axially outward with respect to the exterior coil spring 48. The internal spring 58 is counterwound or helically advances in an opposite axial direction with respect to the exterior coil spring 48 to insure that the internal spring remains within the hollow interior 50 and does not slip into the spaces 52 in the exterior coil spring. Cam grooves 62 and 64, shown in FIGS. 1 and 2 are formed in the bit body 18 and journal pin 16, respectively. The cam grooves face into the annular space between the raceways and are in axial alignment with the balls 60 carried by the driver rollers. The balls 60 at each longitudinal end of the driver rollers are biased into the cam grooves by the springs 58, and the balls move relative to the cam grooves during relative rotation of the race members. A portion 66 of the cam groove 62 is angled or axially inclined with respect to the remaining portion 68. As the driver rollers move the balls 60 to positions contacting the inclined portion 66, the balls 60 are first pushed axially inward into the center of the hollow interior 50 by the compressing half of the cam groove portion 66, and thereafter are allowed to retract or move away from the center of the hollow interior 50 as the balls 60 move over the releasing half of the cam groove portion 66. Since the balls 60 and end elements of the interior lubricant chamber 50, the longitudinal inward movement of the balls 60 reduces the interior volume of the lubricant chamber, thereby forcing lubricant through the spaces 52 between individual coils of the spring 48 onto the raceways. At least one inclined portion 66 is preferably located in an area of high load application, for example the bottom of the annular space between the raceways in the drill bit shown in FIG. 1 or adjacent the area between the raceway portions 22a and 28a shown in FIG. 2, so that compressing the lubricant chamber will force more lubricant onto the raceways in the locations where it is most needed. After compression, the interior lubricant chamber returns to its normal size once the ball members move into the non-inclined portion 68 of the cam groove, and the hollow interior expands to a condition ready to receive additional lubricant from the supply channel 54, for example, to replenish the lubricant chamber.

Cam grooves can be formed on both race members with inclined portions similar to those at 66. However in all cases, at least one ball 60 is inwardly moved to reduce the interior volume of the lubricant chamber 50 as the driver roller moves past the inclined portion of the cam groove of the relative rotating race member. By this arrangement lubricant can, in effect, be pumped from non-loaded areas into loaded areas in the bearing assembly.

The thrust bearing assembly 12 incorporates bearing segments 38 and driver rollers 40 of similar operational concepts and related structure as the bearing segments 34 and driver rollers 36 of the previously described radial bearing assembly 10. In the thrust bearing assembly 12 shown in FIG. 7, one driver roller 40 preferably separates each two adjacent bearing segments 38. The driver rollers 40 are preferably formed by helical coil springs having a tapered or conical external configuration. In order to obtain a true roll over the full length of the driver roller, the apex of the conical driver roller is approximately coincident with the rotational axis 24 of the bearing assembly. In a plane parallel to the rotational axis 24, as shown in FIG. 1, surfaces 70 and 72 of the bearing segments 38 are also angled with respect to one another in the same degree as the conical taper of the driver rollers 40. The surfaces 70 and 72 thereby extend in parallel adjacent complimentary relation to the raceway surfaces 30 and 32, respectively. In a plane perpendicular to the rotational axis, as is shown in FIG. 7, each of the bearing segments is shown to be formed in a truncated pie shaped configuration. Thus, both the conically shaped driver rollers 40 and the pie shaped bearing segments 38 fit together to form the annular ring-like structure of alternating elements 38 and 40 shown in FIG. 7.

Structure and elements corresponding and similar to those previously discussed in conjunction with the radial bearing assembly 10 can be incorporated into the thrust bearing assembly 12 if desired. Elastomer material can be formed around the coils of the conical spring driver rollers 40. End ball members 74 and 76 can be retained at the open ends of the hollow interior of the spring driver rollers 40. The radial outer balls 74 are larger in diameter than the diameter of the radial inner balls 76, in keeping with the size of the end openings of the spring rollers 40 within which the balls are positioned. A counterwound interior spring 78 (one of which is shown in FIG. 7) biases the balls 74 and 76 axially or longitudinally outward of the driver rollers. Cam grooves 80 and 82 are formed in the cutter wheel 14 and journal pin 16 in radial alignment with the balls to receive the balls 74 and 76, respectively, during movement of the driver rollers 40 relative to the cam grooves. The cam groove 82 includes an inclined portion 82a which extends radially outward from and then back toward the axis 24, and the inclined position moves the balls 76 toward and away from the center of the driver roller spring 40. The cam groove 80 is shown as having a uniform depth and therefore no inclined portion, but both cam grooves 80 and 82 could be formed with inclined portions if desired according to the invention.

The function and improvements attained by the thrust bearing assembly 12 are essentially similar and related to those previously described in conjunction with the radial bearing assembly 10. The bearing segments 38 of the thrust bearing assembly withstand substantially all of the load on the bearing assembly and distribute that load over the relatively large areas of surfaces 70 and 72, which are of considerably greater area than point contact or line contact. The driver rollers 40 are preloaded and maintained in continual elastic compression between the raceways 30 and 32 so that all the driver rollers 40 apply indexing force to the bearing segments 38 even though the clearance between the raceways may change and even though only a limited number of all of the bearing segments may be withstanding substantially the whole axial load on the bearing assembly. The driver rollers move the bearing segments relative to both raceways at a rate different than the rotational rates of either raceway. Since the bearing segments are positively indexed, wear is not concentrated on any particular element, high speed operation may be achieved and temperature rise is limited. Lubrication is distributed from the spaces between the individual coils of the driver roller springs over the whole width of the path in which the segments move, and the driver rollers can be arranged to pump lubricant from the hollow interior by the described means for compressing the lubricant chamber of the driver roller elements.

The bearing assemblies of the present invention have been shown and described to provide significant improvements and advancements in the art. The specificity of the disclosure, however, has been made by way of example, and it should be understood that certain departures from the described structure of the preferred embodiment are still encompassed within the scope of the invention defined by the appended claims.

What I claim is:

1. A bearing assembly, comprising:
   means defining a pair of race members operatively retained for relative movement, each race member defining a raceway, the raceways of the pair of race members being positioned in spaced apart and opposing confronting relation;
   a plurality of bearing segments movably positioned intermediate the raceways, each of said bearing segments having bearing surfaces adjoining both raceways, the bearing surfaces adjoining the raceways at surface areas substantially greater than a point contact or a line contact;
   indexing means operatively interconnecting at least one of said race members and at least one of said bearing segments for moving said bearing segments relative to both raceways during relative movement of said race members;
   a lubricating element carried between the raceways and in conjunction with the bearing segments, said lubricating element defining a chamber within which to receive lubricant and passageway means for communicating the lubricant from chamber to said raceways; and
   means operatively associated with at least one of said race members and for expanding and contracting the chamber of said lubricating element during relative movement of said race members.

2. A bearing assembly as defined in claim 1 wherein said expanding and contracting means is connected with at least one of said race members and operatively contacts said lubricating element at a position other than at the raceways.

3. A bearing assembly as defined in claim 2 wherein said expanding and contracting means comprises a cam surface of said one race member.

4. A bearing assembly as defined in claims 1 or 2 wherein the chamber of said lubricating element is expanded and contracted primarily in a direction transverse with respect to the direction of movement of said bearing segments.

5. A bearing assembly as defined in claim 4 wherein said lubricating element is carried between two adjacent bearing segments during relative rotation of said race members.

6. A bearing segment as defined in claim 5 wherein said indexing means and said lubricating element comprise one single element.

7. A bearing assembly as defined in claim 1 wherein said indexing means comprise at least one resilient compressible roller element retained between the raceways of said race members under continuous predetermined compression, the predetermined compression being sufficient to enable rotational movement of each roller element over the raceways during relative rotation of said race members.

8. A bearing assembly as defined in claim 7 wherein said roller element comprises a coil spring member.

9. A bearing assembly as defined in claim 7 wherein said lubricating element also comprises one said resilient compressible roller element.

10. A bearing assembly as defined in claim 7 wherein:
    said one roller element defines a hollow interior and comprises an end element movably connected with said roller element for changing the volume of the hollow interior, the hollow interior defining the lubricant chamber; and
    said expanding and contracting means comprises cam means connected to at least one of said race members, said cam means contacting said end element.

11. A bearing assembly as defined in claim 10 wherein said end element is operatively connected to move in a direction generally aligned with a rotational axis of said roller element to change the volume of the hollow interior.

12. A bearing assembly as defined in claim 10 wherein said one roller element includes one end element retained at each opposing end of said roller element.

13. A bearing assembly as defined in claim 10 wherein:
    each end element comprises a ball,
    said roller element includes means resiliently biasing the ball member against the cam means of said race member, and
    said cam means comprises a groove positioned in said race member to receive the ball member therein during movement of said roller element relative to the raceways.

14. A bearing assembly as defined in claim 13 wherein:
    said roller element comprises an exterior helically coiled spring member defining an axially extending center opening the center opening defining the hollow interior; and
    said resiliently biasing means comprises an interior resilient element retained within the center opening of the exterior coiled spring.

15. A bearing assembly as defined in claim 14 wherein the interior resilient element comprises an interior spring helically coiled in an axially advancing direction opposite of the direction of axial advancement of the coils of the exterior spring, the interior helically coiled spring extending between the ball end elements.

16. A bearing assembly, comprising:
    means defining a pair of race members operatively retained for relative rotation, each race member defining a raceway, the raceways of the pair of race members being positioned in spaced apart and opposing confronting relation;
    a plurality of bearing segments movably positioned in spaced apart relationship intermediate the raceways, each of said bearing segments having bearing surfaces adjoining each raceway, each bearing surface extending in complimentary relation with a corresponding portion of the raceways which the bearing surface adjoins, the bearing surfaces adjoining the raceways at surface areas substantially greater than a point contact or a line contact; and
    a plurality of roller elements, each roller element positioned intermediate a pair of adjacent bearing segments, each roller element having an axis about which the roller element rotates, each roller element being resiliently compressible in a direction transverse with respect to its rotational axis, each roller element extending between the raceways of said race members under predetermined transverse compression, the predetermined transverse compression being sufficient to roll each roller element over the raceways and to move the plurality of bearing segments relative to both raceways during relative rotation of said race members, at least one of said roller elements being a lubricating roller element, each lubricating roller element comprising:
a lubricant chamber within which to receive and contain lubricant,
means for communicating lubricant from the lubricant chamber to the exterior of said lubricating roller element, and
an end element positioned at an axial end of said lubricating roller element, the end element communicatively connected with the lubricant chamber to change the volume of the lubricant chamber upon movement of the end element axially with respect to said lubricating roller element; and
means connected with at least one of said race members for axially moving the end element of each lubricating roller element during relative rotation of said race members.

17. A bearing assembly as defined in claim 16 wherein said means for axially moving the end element moves the end element axially toward the center of said lubricating roller element during a predetermined amount of relative movement of said one race member with respect to said lubricating roller element and moves the end element axially away from the center of said lubricating roller element during a different predetermined amount or relative movement of said one race member with respect to said lubricating roller element.

18. A bearing assembly as defined in claim 17 wherein each lubricating roller element further comprises:
a hollow interior which defines at least part of the lubricant chamber; and
means within the hollow interior for biasing the end element axially away from the center of said roller element.

19. A bearing assembly as defined in claim 18 wherein said means for axially moving the end element comprises:
cam structure operatively connected to said one race member to contact the end element as the lubricating roller member moves relative to said one race member.

20. A bearing assembly as defined in claim 19 wherein:
the cam structure comprises a groove formed in said one race member;
the biasing means within the hollow interior comprises an interior resilient member extending axially within the hollow interior; and
the end element comprises a ball member rotationally retained at an end of the interior resilient member and received within the groove of the cam structure.

21. A bearing assembly as defined in claim 19 wherein:
each lubricating roller element comprises an exterior helically coiled spring, and
the interior resilient member comprises a helically coiled spring which is coiled in an opposite axial advancing direction than the coils of the exterior coil spring.

22. A bearing assembly as defined in claims 1, 7, 9 or 16 wherein each roller element has an exterior conical configuration.

23. A bearing assembly, comprising:
means defining a pair of race members operatively retained for relative rotation, each race member defining a raceway, the raceways of the pair of race members being positioned in spaced apart and opposing confronting relation;
a plurality of bearing segment means movably positioned in spaced apart relationship intermediate the raceways and for circumferential movement relative to one another, each of said bearing segment means having bearing surfaces adjoining each raceway, each bearing surface extending in complimentary relation with a corresponding portion of the raceways which the bearing surface adjoins, the bearing surfaces adjoining the raceways at surface areas substantially greater than a point contact or a line contact; and
a plurality of coil spring driver roller means, each roller means positioned between a pair of adjacent bearing segment means and freely rotationally retained between the raceways to contact one of the bearing segment means between which said roller means is positioned, each roller means being resiliently deformed between the raceways under a predetermined amount of compression, the predetermined compression being sufficient to create and maintain sufficient frictional contact with the raceways to rotate said roller means over the raceways and to apply force to maintain a contacting and indexing relation with an adjacent bearing segment means as the relative distance between the raceways may vary during relative rotation of said race members.

24. A bearing segment as defined in claim 23 wherein each said roller means comprises a coil spring element, and each said coil spring element has an axial length at least substantially equal to the dimension of the bearing surface of said bearing segments in a direction transverse to the movement path of said bearing segments.

25. A thrust bearing assembly, comprising:
means defining a pair of race members operatively retained for relative rotation, each race member defining a raceway, the raceways of the pair of race members being positioned in spaced apart and opposing confronting relation in a plane generally transverse with respect to the axis of rotation of said race members, the raceways of said race members confronting one another in radially outward expanding relation in a plane parallel to the rotational axis of said race members;
means defining a plurality of separate bearing segments extending substantially between the raceways and positioned within the space intermediate the raceways, each of said bearing segments having bearing surfaces adjoining both raceways, the bearing surfaces adjoining the raceways over areas substantially greater than areas of a point contact or a line contact, each bearing segment generally having a truncated pie shaped configuration in a plane transverse with respect to the axis of said race members, the bearing segments withstanding substantially all the axial thrust on said bearing assembly between the raceways; and
at least one conically shaped roller element rotationally retained between two adjacent bearing segments and between the raceways to move relative to points on both raceways during relative rotation of said race members, each roller element being resiliently deformed between the raceways under a predetermined amount of compression sufficient to create sufficient frictional contact with the raceways to rotate over the raceways and to apply force to an adjacent bearing segment during relative rotation of said race members.

26. A bearing assembly, comprising:

means defining a pair of race members operatively retained for relative movement, each race member defining a raceway, the raceways of the pair of race members being positioned in spaced apart and opposing confronting relation;

a roller member extending between the raceways and rotationally moved over the raceways during relative movement of said race members, said roller member defining a hollow interior chamber for receiving lubricant therein, said roller member further comprising an end element operatively attached at one axial end of said roller member for axial movement parallel to the rotational axis of said roller member, the end element further being communicatively connected with the interior chamber for increasing and decreasing the volume of the interior chamber with axial movement of the end element, said roller member further comprising means communicating from the interior chamber to the raceways; and means connected to at least one of said race members for contacting the end element of said roller member and for moving the end element axially relative to said roller element.

27. A bearing assembly as defined in claim 26 wherein said means for axially moving the end element contacts and axially moves the end element during relative movement of said race members.

28. A bearing assembly as defined in claim 27 wherein:

the end element of said roller member comprises a ball and said means for axially moving the end element comprises a groove formed in a race member in a position to receive the ball therein during relative movement of said race members.

29. An invention as defined in claims 1, 8, 9, 10, 16, 19, 23, 25 or 26 wherein said bearing assembly operatively supports a cutter wheel of a drill bit for rotation on a journal pin of said drill bit, and wherein the journal pin and the cutter wheel define the pair of race members of said bearing assembly.

30. A bearing assembly in combination with a drill bit, said bearing assembly operatively retaining and supporting a cutter wheel of said drill bit for relative rotation about a journal pin fixed to said drill bit, said journal pin and said cutter wheel defining a pair of race members of said bearing assembly, an external surface of said journal pin defining one raceway and an internal surface within said cutter wheel defining another raceway positioned in spaced apart and opposing confronting relation with the raceway of said journal pin, said bearing assembly comprising:

bearing segment means circumferentially movably positioned relative to each other in spaced apart relationship intermediate the raceways, each of said bearing segment means having bearing surfaces adapted for adjoining each raceway, each bearing surface extending in complementary relation with a corresponding portion of the raceways which the bearing surface adjoins, the bearing surfaces adjoining the raceways at surfaces areas substantially greater than a point contact or a line contact; and a plurality of driver roller means, each driver roller means positioned between a pair of adjacent bearing segment means and freely rotationally retained between the raceways to contact one of the bearing segment means between which said roller means is positioned, each roller means being resiliently deformed between the raceways under a predetermined amount of compression, the predetermined compression being sufficient to create sufficient frictional contact with the raceways to rotate over the raceways and to apply force and to index an adjacent bearing segment means during relative rotation of said race members as wear may be experienced by the lower portion of the raceway of the radially inner journal pin race member and by the whole raceway of the radially outer cutter wheel race member.

31. An invention as defined in claim 30 wherein each driver roller means comprises a coil spring element.

* * * * *